US005908115A

United States Patent [19]

Govoni et al.

[11] Patent Number: 5,908,115

[45] Date of Patent: Jun. 1, 1999

[54] METHOD AND APPARATUS FOR THE CLASSIFICATION OF SOLID PARTICLES

[75] Inventors: Gabriele Govoni, Renazzo; Arrigo Arletti, Finale Emilia, both of Italy

[73] Assignee: Montell North America, Inc., Wilmington, Del.

[21] Appl. No.: 08/750,540

[22] PCT Filed: May 23, 1995

[86] PCT No.: PCT/EP95/01948

§ 371 Date: Feb. 11, 1997

§ 102(e) Date: Feb. 11, 1997

[87] PCT Pub. No.: WO95/32811

PCT Pub. Date: Dec. 7, 1995

[30] Foreign Application Priority Data

May 27, 1994 [IT] Italy ................................ MI94A1076

[51] Int. Cl.$^{6}$ ................................................ B65G 53/60

[52] U.S. Cl. .......................... 209/359; 209/352; 209/250

[58] Field of Search .................................... 209/352, 359, 209/250

[56] References Cited

U.S. PATENT DOCUMENTS

| | | | |
|---|---|---|---|
| 339,723 | 4/1886 | Winkler | 209/359 |
| 2,769,544 | 11/1956 | Morrow . | |
| 2,866,553 | 12/1958 | Schmehl et al. | 209/359 |
| 3,116,238 | 12/1963 | Van Etten | 209/250 |
| 3,685,651 | 8/1972 | Gruber | 209/250 |
| 3,774,759 | 11/1973 | Weintraub et al. . | |
| 3,918,585 | 11/1975 | Hagelstam | 209/250 |
| 4,229,286 | 10/1980 | Bridges | 209/359 |
| 4,242,197 | 12/1980 | Voeiskow et al. . | |
| 4,268,294 | 5/1981 | Laughlin et al. | 209/250 |
| 4,300,445 | 11/1981 | Hazen | 209/352 |
| 4,333,572 | 6/1982 | Frykhult | 209/250 |
| 4,399,054 | 8/1983 | Ferraris et al. . | |
| 4,411,778 | 10/1983 | Venable . | |
| 4,466,862 | 8/1984 | Ring et al. | 209/250 |
| 4,699,710 | 10/1987 | Williams | 209/250 |
| 4,879,024 | 11/1989 | Chervonenko et al. | 209/352 |
| 4,995,966 | 2/1991 | Ofner | 209/250 |
| 5,624,558 | 4/1997 | Aaltonen et al. | 209/250 |

FOREIGN PATENT DOCUMENTS

| | | |
|---|---|---|
| A-103702 | 3/1984 | European Pat. Off. . |
| A-395-083 | 10/1990 | European Pat. Off. . |
| A-2198794 | 4/1974 | France . |
| A-17-57-516 | 2/1972 | Germany . |
| A-32-23-073 | 3/1984 | Germany . |
| C-34-42-708 | 11/1984 | Germany . |
| 775196 | 9/1955 | United Kingdom . |
| WO-92/19392 | 11/1992 | WIPO . |

OTHER PUBLICATIONS

Derwent Abstract and Family Search for EP–A–103,702.
Derwent Abstract and Family Search for FR–A–2,198,794.

*Primary Examiner*—Karen M. Young
*Assistant Examiner*—Douglas Hess
*Attorney, Agent, or Firm*—Bryan Cave LLP

[57] ABSTRACT

A method and apparatus for the classification of solid particles, in particular powdery catalytic components for the polymerization of olefins, which comprises sending solid particles suspended in a transporting gas flow through a screening device. Immediately upstream to the screening device there is an auxiliary fluidized bed classifier, in which the top of the bed is at the level of the lower part of the screening device.

11 Claims, 3 Drawing Sheets

METHOD AND APPARATUS FOR THE CLASSIFICATION OF SOLID PARTICLES

The present invention relates to a method and apparatus for the classification of solid particles. More particularly it relates to a classification method which comprises sending solid particles with a diameter generally less than 200 μm suspended in a flow of transporting gas through a screening means and in which the cut-off value of the screening may be as low as 20–25 μm.

It is well known that in the preparation of the catalyst supports as well as of the solid components it is necessary to control carefully the solid granulometry, particularly in the case in which the particle size distribution (PSD) of the catalyst directly influences the morphology of the final product. This is the case, for example, of the modern gas phase processes for the polymerisation of olefins, in which supported catalysts of the Ziegler/Natta type are used. The latest technology developments in the preparation of said catalysts allow to produce extremely active catalyst components, the size and morphology of which strongly influence the characteristics and morphology of the obtained polymer. In particular, the use of catalysts supported on magnesium chloride, which allow a remarkable simplification in the process for the production of polyolefins (polyethylene, polypropylene, EPR, EPDM, etc.), is well known. In fact, it is possible to obtain catalysts in the form of spherical particles which are suitable for producing polymers that duplicate the spherical form of the catalysts; said polymers have good morphological characteristics (fluidity and bulk density) and do not require final extrusion and pelletization steps which, as is well known, are expensive in terms of apparatus and energy required. The support of such catalysts is normally obtained by reacting magnesium chloride with an alcohol in an inert hydrocarbon. The particles of the obtained $MgCl_2$/alcohol adduct are subsequently de-alcoholated and treated with titanium halide, thus obtaining a catalytic component to be used in the polymerisation reaction. Examples of such catalysts are given, for example, in patents U.S. Pat. No. 4,399,054 and EP 395083.

It is clear that, in view of the above mentioned mechanism of replication of the initial form of the catalyst component particles, it is extremely important to avoid the introduction of very small particles in the reaction system, since said small particles bring about the formation of fines in the final polymer with consequent problems in the plant operation. Therefore, an essential step in the preparation of the support or the catalytic component is the screening, which should be carried out in such a way to obtain particles having diameters falling within the desired range. The known methods of classification (by gravity or centrifugal force in liquid or gas) have the drawback that a clear-cut screening is not possible. In other words, when particles having a diameter lower than a particular cut-off value have to be removed, the above mentioned known processes bring about removal of a portion of the particles having a useful dimension together with the fines. This is due to the fact that it is necessary to eliminate the "grey area" around the cut-off value, which is a serious drawback in the case where the substance to be classified is expensive.

Other classification systems are based on calibrated filtering grids which, however, create problems both in terms of low productivity and in terms of filtering grid fouling, especially in the case of reduced mesh opening size (for example between 20 and 25 μm). Another disadvantage of such a system derives from the mechanical energy transmitted from the vibrating filtering grid to the particles, which can cause breakage (with the consequent lowering of overall efficiency in the classification operation) of fragile particles, such as those comprising magnesium chloride/alcohol adducts, or can damage the particles with subsequent problems during the polymerisation (generation of fines). One of these systems is illustrated in WO92/19392 where a circular vibratory screen separator employing particular slots for receiving said circular screen is disclosed.

European patent EP-A-103702 describes a filtration system for carbon particles in which a discontinuous fluidised bed is associated with a horizontal filtering grid which separates particles having a diameter of higher than 1 mm. The system is not suitable for continuous classification of fine particles, and the system for cleaning the filtering grid by mechanical vibrations is not suitable for classifying fragile particles.

Fr-A-2.198.794 discloses an apparatus for the transfer and classification of fine solid particles, such as flour, in which the solid particles are suspended in a transporting gas flow which transports them toward a grid. In order to avoid the blocking of the grid, a high fluidification energy is given to the particles in an enlarged zone in front said grid trough auxiliary gas flows coming from a series of holes which are located on the circular walls of said enlarged zone. The high fluidification energy involved, although avoiding the blocking of the screening device, makes the apparatus not suitable for fragile particles.

In GB-A-775,196 the problem of the blocking of the grid is solved by increasing the energy of the particles approaching said grid by means of a rotating device capable of providing gas jets. Also in this case the apparatus is not suitable for fragile particles.

It is therefore an object of the present invention a new method for the classification of solid particles which, besides having a high efficiency of separation, is suitable for the treatment of fragile particle. The method of the present invention is particularly useful for screening granular or spherical form $MgCl_2$/alcohol adducts or solid catalyst components of the Ziegler-Natta type to be used in the polymerisation of $\alpha$-olefins.

The method according to the present invention comprises suspending solid particles to be classified in a transport gas flow and transporting them to a screening means where screening of said particles occurs; the method is characterised by the fact that a fluidised bed of particles not passed through the screening means is established upstream said screening means, whereby particles susceptible to pass through said screening means are ejected from the fluidised bed and re-introduced into the transport gas flow. The efficiency of the classification operation, and consequently a more precise cut-off between the particles collected upstream and downstream the screening means, is increased by the fact that the fine particles ejected from the fluidised bed into the transporting gas flow are presented again before the screening means and their probability to pass through it is greatly increased. The oversize particles (i.e. the solid particles having a diameter larger than the desired cut-off value) are discharged from the fluidised bed.

The fluidised bed is established, for example, by means of an auxiliary gas flow fed into a zone upstream to said screening means at a point below the latter, in a direction substantially perpendicular to the transport gas flow.

The screening means is preferably a vertically placed screen and the transport gas flow is substantially perpendicular to the screen.

Preferably, the screen is cleaned periodically by means of a high speed localised gas stream, flowing counter-currently to the transport gas. The cleaning can be carried out, for example, using a rotating bar, parallel and close to the screen, provided with a number of nozzles from which pressurised gas is ejected.

According to another embodiment of the invention, downstream to the screening means, which preferably is a calibrated metallic net, the transport gas flow containing the fines is fed to a separating device; the gas exiting from said separating device is added with solid particles to be classified and recycled to the screening apparatus.

The speed of the particle transporting gas flow near the screen is preferably less than 2 m/s, more preferably less than 1 m/s; a speed between 0.3 and 0.5 m/s is particularly suitable. The speed of the gas used to clean the screen depends on the type of solid to be classified and must be in any case sufficient to achieve a good cleaning of the screen without being at the same time excessive so that the solid particles are not damaged.

The residence time of the solid in the fluidised bed upstream to the screening means is preferably between 1 and 20 minutes, more preferably between 5 and 10 minutes. The speed of the fluidisation gas is related to the type of particles to be classified and is generally between 2 and 6 cm/s.

The process according to the invention may be advantageously used for simultaneously drying and classifying supports and/or catalyst components impregnated with the hydrocarbon solvent used in their preparation.

Further advantages and characteristics of the method and device according to the invention will be apparent from the following description and the attached drawings, in which.

Figure 1:
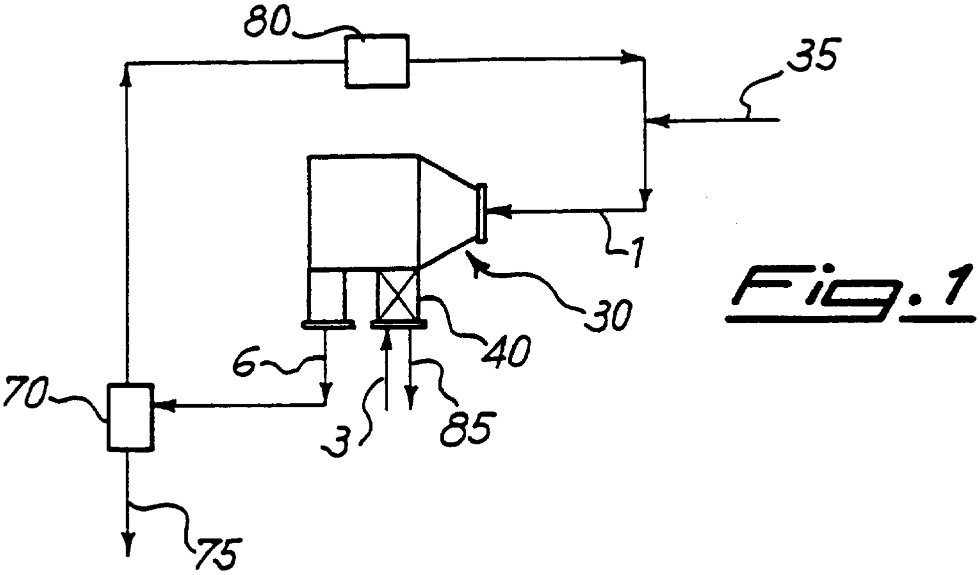
FIG. 1 is a schematic view of the classification apparatus.

With reference to the drawings, (30) indicates the device for classification of solid particles consisting of a hollow housing inside of which a screening means (2) is placed, said screening means consisting of a rigid perimeter frame (21) and a metallic net (22), vertically placed in such a way to be substantially perpendicular to the gas flow (1). Said gas flow (1) includes the particles to be classified, which are fed in (35), either as dry product or as hydrocarbon suspension, into the transporting gas. The housing (11) comprises an initial funnel shaped connecting part (110), in which the speed of the transport gas is reduced to values of the order of 0.3–0.5 m/s. Downstream to the funnel shaped part (110), the housing (11) has a cylindrical part (111), in which the screening means (2) is placed.

Figure 3:
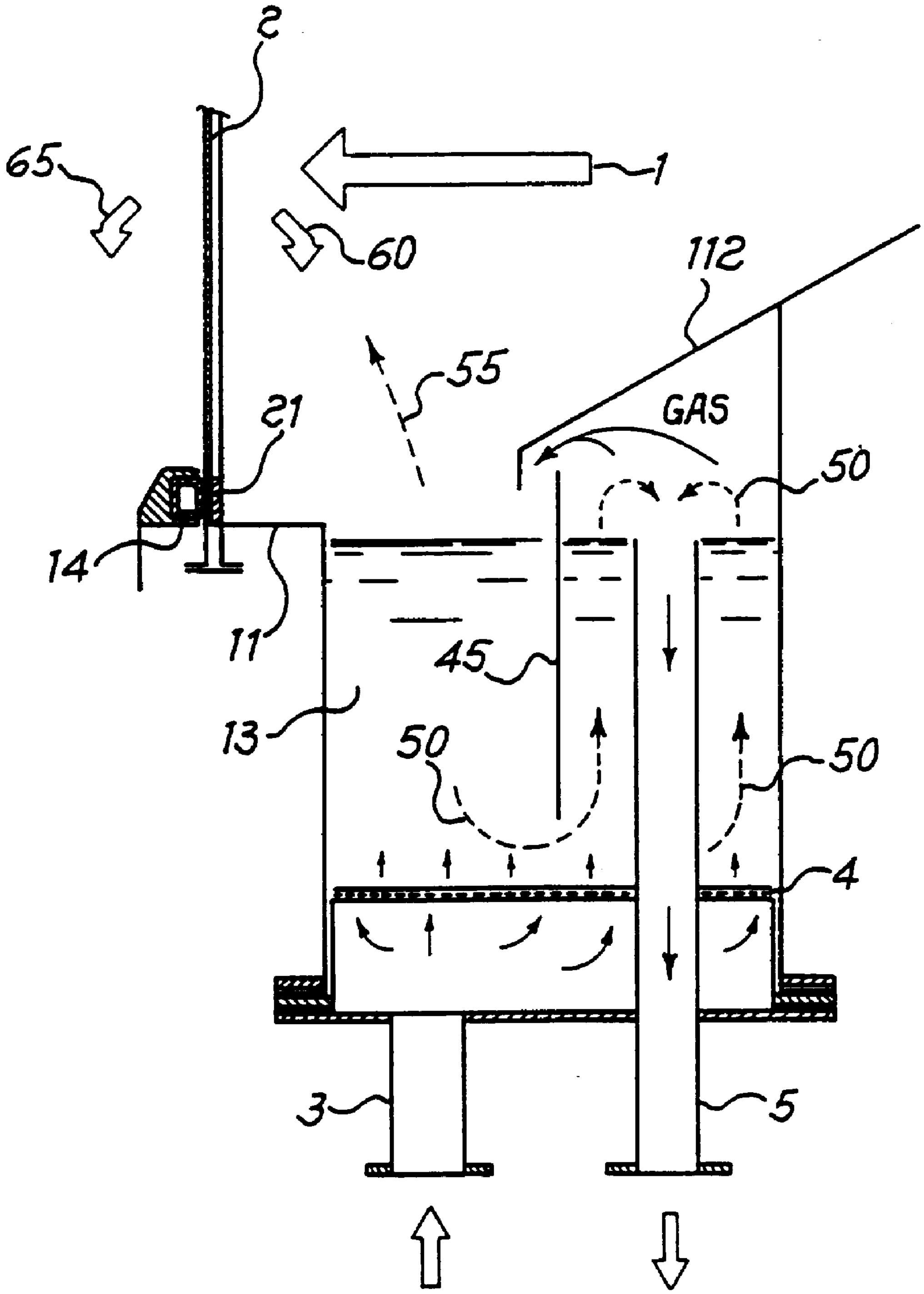
FIG. 3 is an enlarged-scale part of FIG. 2.

A rectangular collecting chamber (40) is placed below the cylindrical part of the housing, and is equipped at the lower part with a fluidisation gas distributor (4), fed from inlet port (3). The collecting chamber (40) is divided into two parts by a vertical baffle (45). The part of chamber (40) close to the screening means (2) is the classification zone. The part of the chamber separated from said classification zone is the discharge zone and is upperly shielded from falling particles by the part (112) of the housing (11). A discharging device (5) of the overflow type is installed in the discharge zone, in a position such that the top of the fluidised bed (13) is about at the same level of the lower edge of the screening means (2). As illustrated in FIG. 3, the oversize particles [i.e. the particles having a diameter higher than the cut-off value, the path of which is schematically indicated in FIG. 3 with arrows (50)] “drop” into the fluidised bed contained in the classification zone and, passing under the baffle (45), may be fed into the discharge zone from which they exit through the device (5). With the above described arrangement of the fluidised bed (13), the probability of the fine particles to be re-sent to the screening means, and therefore to pass through it, is greatly increased [schematically the path is indicated with arrow (55) in FIG. 3]. Furthermore, in FIG. 3, the arrow (60) schematically indicates the fraction of fines which fall into the classification zone of chamber (40), and the arrow (65) represents the fraction of fines carried towards the discharge of the classification device (30), indicated in the drawings with the reference numeral (6).

A rotating cleaning gas distributor (9) is placed downstream to the screening means (2), said gas distributor consisting of a bar which is perforated or equipped with a slit nozzle; the pressurised cleaning gas, preferably having the same composition as the transporting gas, is fed to the rotating gas distributor in (8). The bar is rotated by, e.g., an electric motor (7) at a regulatable speed depending on the type of solid to be classified and the level of blinding of the screen. The discharge (6) of the classification device (30) is fed to a solid/gas separation system having high efficiency, indicated in the Figures by the reference (70) from which the fines are discharged in (75). The solid-gas separation system is, for example, a scrubber or a bag filter. The gas exiting the separation system (70), substantially free from fines, is recycled to the device (30) by means of a blower (80), after being added with solids to be classified in (35).

The fine particles (i.e. the particles having a diameter less than the mesh opening size of the screen) which come into contact with the screening means (2) may not pass immediately through the mesh, depending on the type of impact with the mesh itself, and may fall into the collecting chamber (40). In the absence of the fluidised bed (13), the solid discharged in (85) would contain a not-negligible amount of particles with a diameter smaller than the mesh opening size of the screening means (2) (see comparative example). The efficiency of the screening is considerably increased by the presence of the fluidised bed (13), since the fines tend to be ejected from the fluidised bed and resent to the screening means with a considerable increase in probability of passing through the latter. It should be pointed out that both the conditions of impact with the mesh and a short residence time of the solid in the fluidised bed allow the screening of fragile particles to be carried out without breakage problems of the particles themselves; the apparatus can therefore be used even in the case of particularly fragile supports and catalyst components.

Figure 4:
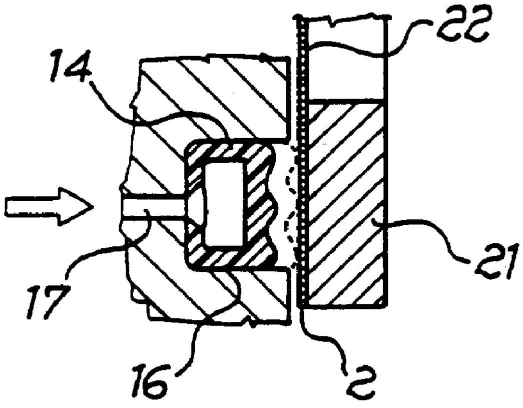
FIG. 4 is a detail of FIG. 3 and illustrates the perimeter seal of the screen.
Figure 5:
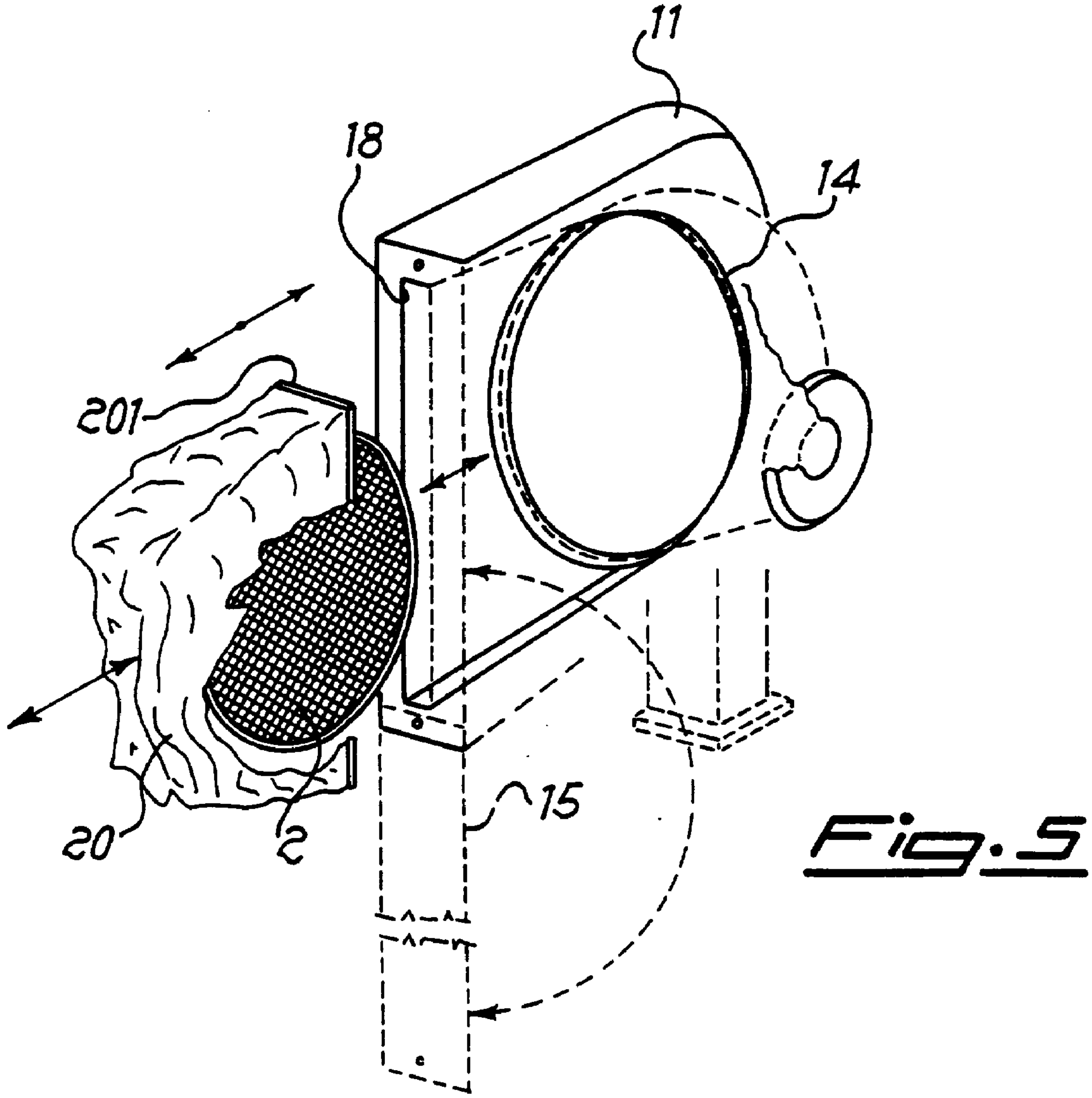
FIG. 5 is a view of the system for the rapid exchange of the screen in the device of FIG. 2.

The device (30) may be advantageously equipped with a rapid exchange system of the screening means, schematically illustrated in FIGS. 4 and 5. Said system comprises a hollow annular gasket (14) of elastomeric material, placed in a corresponding annular groove (16) (see FIG. 4) provided for in the lateral wall of the housing (11), and connected to a pressurised inert gas source in (17). The housing (11) of the device (30) has a lateral slit (18), closed by a door (15), for the introduction and extraction of the screening means (2). When it is necessary to substitute the screening means (2), the door (15) is opened and the hollow gasket (14) is depressurised [the situation is illustrated by the continuous line in FIG. (4)], in such a way that it no longer exerts pressure on the frame (21) of the screening means (2). At this point, the latter is extracted, like a drawer, into a special flexible case (20) in order to avoid the possibility of solid particles coming off the screen (22) and contaminating the environment. The flexible case (20) of polymeric material is equipped with a flat frame (201), designed to seal and fit the lateral slit (18) on the lateral wall of housing (11). To introduce a new screen, which is preferably contained in a sealed flexible case (20), the opposite procedure is followed, whilst maintaining the gasket (14) depressurised. The screening means substitution is completed by closing the door (15) and pressurizing the gasket (14) (set up illustrated in FIG. 4 with dotted lines). Only a few minutes are needed to carry out the entire procedure, and problems of pollution outside the apparatus and the introduction of atmospheric humidity inside are avoided.

Figure 2:
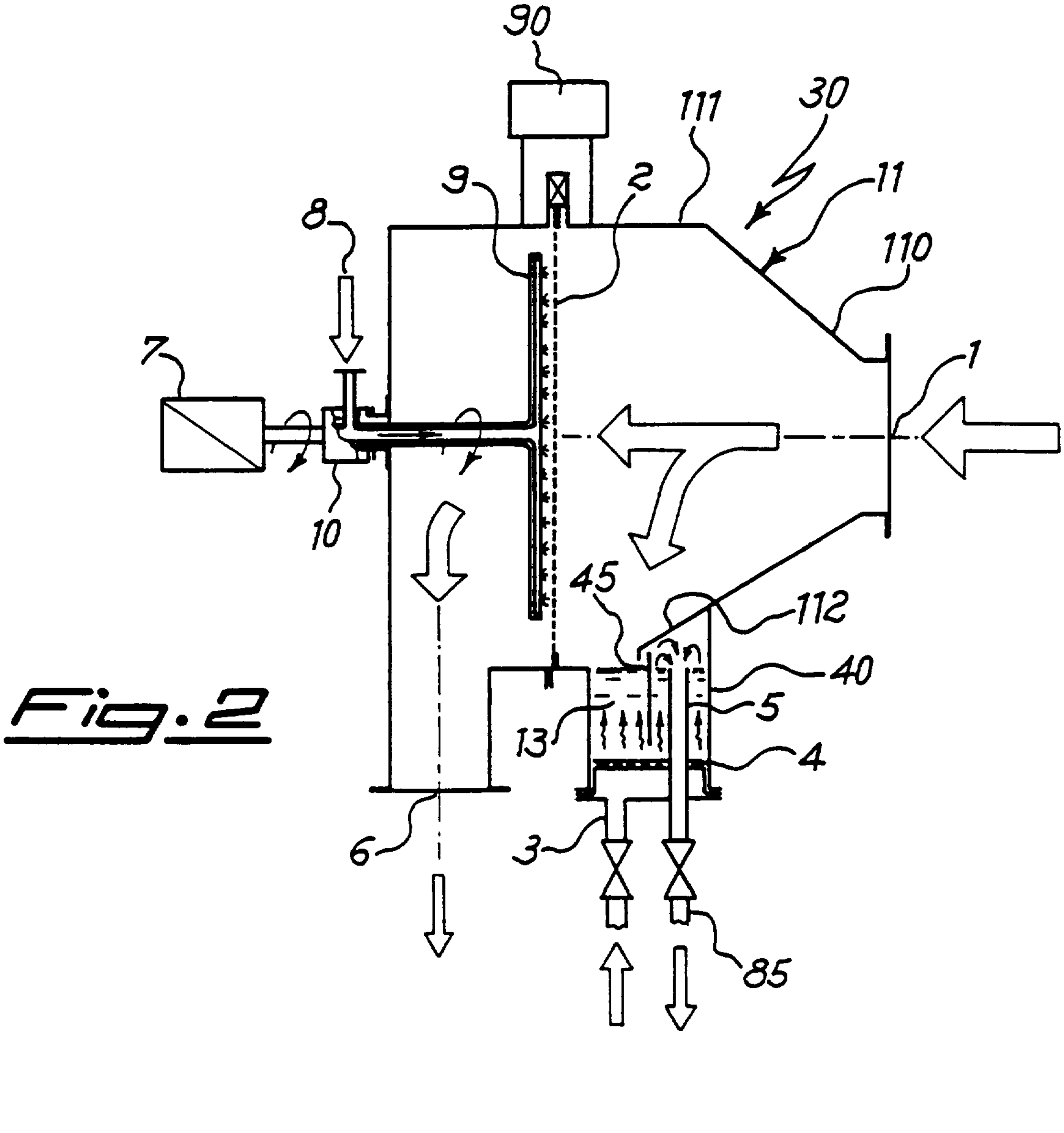
FIG. 2 is a large-scale longitudinal section view of the classification device used in the apparatus of FIG. 1.

The classification apparatus (30) is preferably equipped with a safety manostat (90) (FIG. 2) which indicates when the set value for the pressure drop through the screen is exceeded, thus avoiding breakage in the case of excessive mesh blinding and promptly indicating when it is necessary to substitute the screening means.

The process according to the invention may be applied to the case where the product of interest is that with an average size of higher than the nominal screen mesh, or in the case where a product having a average size smaller than the screen mesh is of interest. To classify the particles according to different cut-off values, it is possible to use more than one device according to the invention in series.

The process according to the invention is further described with reference to the following example.

EXAMPLES 1–4

An industrial scale apparatus was used with a screen having a diameter of about 0.8 m and with a transport gas flow (nitrogen) equal to about 600 $Nm^3/h$. Three different types of powder, consisting of catalytic components of the type described in the European patent EP-A-395083, were subjected to screening in order to remove fine particles. Pure nitrogen was used as transport gas, fluidisation gas and washing gas (fed at a flow of about 150 Kg/h). The speed of the fluidisation gas was maintained at 4 cm/s. The results of the tests are reported in the table 1. In said table, the mesh size of the screen, the granulometric distribution of the fed solid, its flow rate, the granulometric distribution and flow rate of the product of interest (i.e. the particles not passed through the screen and therefore discharged from the fluidised bed upstream from said screen) are reported for each example. The analysis of granulometric distribution of the catalytic components was carried out with a laser analyzer model Malvern Instrument 2600. The determination of the distribution of the diameter of single solid particles with said instrument is based on the optical diffraction of monochromatic laser beam. The analysis method involves the addition of a sample in a measure cell containing hexane and equipped with a stirrer and a recycling pump. The measures are carried out keeping the suspension recycled. The central unit of the analyzer elaborates the signals received and calculates the granulometric distribution of the particles in the sample of different classes of diameters. In table 1, the granulometric distribution of the solid is defined as values of particle diameters (in $\mu$m) below which a determined volumetric percentage of particles is comprised. For example, with reference to $P_5$, the value reported (in $\mu$m) means that 5% of the particles have a diameter below the reported value.

Example 4 (comparative) has been carried out without the fluidised bed upstream from the filtering grid. Comparing the results of example 4 with those of example 3 (in which the same solid particles were classified) it is clear that the device according to the invention allows a better classification to be obtained; in fact, considering that the particles of interest are those having a diameter greater than 44 $\mu$m, the values of $P_1$ and $P_5$ clearly show that the content of fine particles in the useful product is greater in example 4 than in example 3.

TABLE 1

| | | FEEDING | | | | | USEFUL PRODUCTS (not sieved) | | | | |
|---|---|---|---|---|---|---|---|---|---|---|---|
| | Mesh size | granulomet. distrib. ($\mu$m) | | | | Flow Rate | granulomet. distrib. ($\mu$m) | | | | Flow rate |
| Ex. | ($\mu$m) | $P_1$ | $P_5$ | $P_{10}$ | $P_{50}$ | (kg/h) | $P_1$ | $P_5$ | $P_{10}$ | $P_{50}$ | (kg/h) |
| 1 | 25 | 7 | 32 | 38 | 64 | 80 | 29 | 36 | 41 | 65 | 76 |
| 2 | 37 | 11 | 28 | 34 | 57 | 100 | 30 | 36 | 40 | 61 | 90 |
| 3 | 44 | 4.5 | 15 | 35 | 55 | 100 | 41 | 55 | 61 | 83 | 88 |
| 4 (c.) | 44 | 4.5 | 15 | 35 | 55 | 100 | 30 | 49 | 53 | 75 | 86 |

We claim:

1. Method for the classification of solid particles comprising suspending solid particles to be classified in a transport gas flow and transporting them to a screening means where screening of said particles occurs, wherein a fluidised bed of particles not passed through said screening means is established upstream from said screening means, whereby particles susceptible to pass through said screening means are ejected from the fluidised bed and reintroduced into said transport gas flow, thereby improving the efficiency of the classification.

2. The method according to claim 1, wherein said fluidised bed is established by means of an auxiliary gas flow fed into a zone upstream to and at a point below said screening means in a direction substantially perpendicular to said transport gas flow.

3. The method according to claim 1, wherein said screening means is a vertically placed screen and said transport gas flow is substantially perpendicular to said vertically placed screen.

4. The method according to claim 1, wherein the transport gas flow downstream to said screening means is fed to a separator device, the gas exiting said device being recycled to said screening means after being added with solid particles to be classified.

5. The method according to claim 1, wherein the speed of the transport gas in the zone near the screening means is less than 2 m/s.

6. The method according to claim 1, wherein the residence time of the solid in the fluidised bed is between 1 and 20 minutes.

7. The method according to claim 1, wherein the speed of the fluidisation gas is between 2 and 6 cm/s.

8. The method according to claim 1, wherein said screening means is periodically cleaned by a localised gas stream flowing counter-currently to the transport gas.

9. Apparatus for the classification of solid particles, comprising a housing, a screening means, a means for feeding a stream of transport gas containing particles to be classified, a means for collecting and discharging large particles upstream of the screening means and a means for separation of fine particles from the gas downstream of the screening means and a means for separation of fine particles from the gas downstream of the screening means, wherein the means for collecting and discharging large particles comprises a fluidised bed placed at a point below the screening means in such a way to carry out further classification of particles not previously passed through the screening means, and further wherein the means for collecting and discharging large particles comprises a first part close to said screening means and a second part separated from the first part by a vertical baffle placed at a distance from a gas distributor so as to allow the feeding of the solid from the first part to the second part of the means for collecting and discharging large particles, in the second part a discharge device of the overflow type being placed.

10. Apparatus according to claim 9, further comprising a rapid exchange system of the screening means, the screening means having a rigid perimeter frame the rapid exchange system comprising a hollow annular gasket of elastomeric material placed in a corresponding annular groove provided for in the housing and connected to a pressure gas source, the hollow annular gasket exerting pressure, when pressurized, on the rigid perimeter frame of the screening means, the housing having a lateral slit, closed by a door, for the introduction and extraction of the screening means.

11. Apparatus according to claim 9, in which the screening means consists of a circular screen, wherein the apparatus further comprises a cleaning system for the screen, placed downstream from the screen itself, the cleaning system comprising at least one rotating bar parallel and close to the screen and equipped with nozzles for the cleaning gas coming out under pressure counter-currently to the transport gas.

* * * * *